United States Patent
Rodriguez

(10) Patent No.: US 11,441,367 B2
(45) Date of Patent: Sep. 13, 2022

(54) DIRECT EMULSIONS AND METHODS OF USE

(71) Applicant: M-I L.L.C., Houston, TX (US)

(72) Inventor: Carlos Rodriguez, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/952,137

(22) Filed: Apr. 12, 2018

(65) Prior Publication Data

US 2018/0298706 A1    Oct. 18, 2018

Related U.S. Application Data

(60) Provisional application No. 62/484,851, filed on Apr. 12, 2017.

(51) Int. Cl.
| | | |
|---|---|---|
| E21B 21/00 | (2006.01) | |
| C09K 8/32 | (2006.01) | |
| C09K 8/26 | (2006.01) | |
| C09K 8/05 | (2006.01) | |
| C09K 8/03 | (2006.01) | |

(52) U.S. Cl.
CPC ............ *E21B 21/003* (2013.01); *C09K 8/032* (2013.01); *C09K 8/05* (2013.01); *C09K 8/265* (2013.01)

(58) Field of Classification Search
CPC ......... E21B 21/003; C09K 8/032; C09K 8/05; C09K 8/265
See application file for complete search history.

(56) References Cited

U.S. PATENT DOCUMENTS

| | | | | |
|---|---|---|---|---|
| 1,819,646 A | * | 8/1931 | Loomis ..................... | C09K 8/16 175/72 |
| 2,856,356 A | * | 10/1958 | Weiss ..................... | C09K 8/145 507/108 |
| 3,062,740 A | * | 11/1962 | Reddie ..................... | C09K 8/28 507/136 |
| 3,396,105 A | * | 8/1968 | Burdyn ..................... | C09K 8/22 507/133 |
| 3,628,615 A | * | 12/1971 | Chenevert ................. | C09K 8/26 166/275 |
| 3,738,437 A | * | 6/1973 | Scheuerman ............ | C09K 8/24 175/70 |
| 3,850,817 A | * | 11/1974 | Barthel ..................... | C09K 8/05 507/145 |
| 3,878,110 A | * | 4/1975 | Miller ...................... | C09K 8/16 507/111 |
| 3,882,029 A | * | 5/1975 | Fischer ................... | C09K 8/206 507/213 |
| 4,046,197 A | * | 9/1977 | Gruesbeck, Jr. ........ | E21B 43/04 166/305.1 |
| 4,201,679 A | * | 5/1980 | Barker ..................... | C09K 8/24 507/120 |
| 4,526,693 A | * | 7/1985 | Son ......................... | C09K 8/16 175/65 |
| 4,561,985 A | * | 12/1985 | Glass, Jr. ................ | C09K 8/206 507/108 |
| 5,309,999 A | * | 5/1994 | Cowan ..................... | C04B 7/52 106/790 |
| 5,635,457 A | * | 6/1997 | Van Slyke ............... | C09K 8/60 507/103 |

OTHER PUBLICATIONS

Schlumberger Oilfield Glossary, organophilic clay, retrieved May 8, 2020 from https://www.glossary.oilfield.slb.com/Terms/o/organophilic_clay.aspx (Year: 2020).*

* cited by examiner

*Primary Examiner* — Angela M DiTrani Leff

(57) ABSTRACT

A method comprising drilling through a plurality of differing zones of a subterranean formation using a drilling fluid comprising a non-oleaginous continuous phase, an oleaginous discontinuous phase and at least a first salt dissolved into the non-oleaginous continuous phase. The amount of the at least first salt dissolved into the non-oleaginous continuous phase is maintained such that a density of the drilling fluid varies by no more than 10% while drilling through the plurality of zones.

19 Claims, No Drawings

DIRECT EMULSIONS AND METHODS OF USE

CROSS REFERENCE TO RELATED APPLICATIONS

This application claims the benefit of priority to U.S. Provisional Patent Application No. 62/484,851, filed on Apr. 12, 2017, the entire content of which is incorporated herein by reference.

BACKGROUND

During the drilling of a wellbore, various fluids are used in the well for a variety of functions. The fluids may be circulated through a drill pipe and drill bit into the wellbore, and then may subsequently flow upward through wellbore to the surface. During this circulation, a drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure, to prevent the ingress of formation fluids into the wellbore, to cool and lubricate the drill string and bit, and/or to maximize penetration rate. The drilling fluid should also form a thin, low permeability filter cake that seals openings in formations penetrated by the bit and act to reduce the unwanted influx of formation fluids from permeable rocks.

The selection of the type of wellbore fluid to be used in a drilling application involves a careful balance of both the good and bad characteristics of the wellbore fluids in the particular application and the type of well to be drilled. Drilling fluids are classified according to their base fluid. Drilling fluids fall into two main categories: water-based drilling fluids, also known as water based muds (WBMs), in which the carrier is an aqueous medium; and oil-based drilling fluids, also known as oil-based muds (OBMs), in which the carrier is oil. OBMs are generally technically superior to WBMs in certain important respects, including the comparative lack of adverse reactivity of OBMs with shales, one of the most commonly encountered rock types during drilling for oil and gas. Use of OBMs, however, has the disadvantage of resulting in production of large quantities of oil-contaminated waste products such as cuttings that are difficult to dispose of in an environmentally acceptable way. While use of WBMs is environmentally more acceptable than OBMs, the performance of WBMs, particularly when drilling through water sensitive rocks such as shales, is technically inferior to that of OBMs. Shales exhibit great affinity for water, and adsorption of water by shales causes the shale to swell and produces chemical changes in the rock which produce stresses that weaken the formation, possibly leading to erosion of the borehole or loss of structure. This can lead to drilling problems such as stuck pipe. In addition, inferior wellbore quality may hinder logging and completion operations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method that includes drilling through a plurality of differing zones of a subterranean formation using a drilling fluid comprising a non-oleaginous continuous phase, an oleaginous discontinuous phase and at least a first salt dissolved into the non-oleaginous continuous phase, wherein an amount of the at least first salt dissolved into the non-oleaginous continuous phase is maintained such that a density of the drilling fluid varies by no more than 10% while drilling through the plurality of zones.

In another aspect, embodiments of the present disclosure relate to a method that includes drilling into at least an upper zone of a subterranean formation comprising at least one first salt with a drilling fluid comprising a non-oleaginous continuous phase, an oleaginous discontinuous phase and at least a second salt dissolved into the non-oleaginous continuous phase, wherein during the drilling an amount of the at least second salt dissolved into the non-oleaginous continuous phase is maintained such that a density of the drilling fluid varies by no more than 10% during the drilling; and drilling into at least an intermediate zone and/or a lower zone of the subterranean formation using said drilling fluid.

In yet another aspect, embodiments of the present disclosure relate to a method that includes drilling into at least an upper zone of a subterranean formation comprising swellable clays therein with a drilling fluid comprising a non-oleaginous continuous phase, an oleaginous discontinuous phase and at least one salt dissolved into the non-oleaginous continuous phase, wherein an amount of the at least one salt is selected to be dissolved into the non-oleaginous continuous phase such that a reactivity of the swellable clay is reduced; and drilling into at least an intermediate zone and/or a lower zone of the subterranean formation having a lower pressure than the upper zone using the said drilling fluid.

Other aspects and advantages of the claimed subject matter will be apparent from the following description and the appended claims.

DETAILED DESCRIPTION

Generally, embodiments disclosed herein relate to methods of drilling through various subterranean formations. More specifically, embodiments disclosed herein relate to methods for drilling through a plurality of differing zones of a water sensitive subterranean formation using drilling fluids formed of a non-oleaginous continuous phase, an oleaginous discontinuous phase and at least a salt dissolved into the non-oleaginous continuous phase. The inventor of the present disclosure has found that controlling the salt content of an oil-in-water drilling fluid (direct emulsion) may prevent or reduce the interaction of the non-oleaginous phase with the subterranean formation, enabling water-sensitive earth formations (such as salt dome and clay reactive formations) to be drilled with a reduced difficulty and/or reduced changes to the fluid during the drilling operation. This may be particularly useful to use a single drilling fluid for drilling sequentially through a water-sensitive zone and a low pressure zone without casing the upper of the two zones. For example, drilling fluids as described herein having low water loss may prevent free water from penetrating into the formation and thus may prevent the hydration of certain shales which otherwise might swell or slough off the walls of the borehole, causing sticking of the drill or a closure of the hole. Similarly, leaching salt from a salt dome formation during drilling using the drilling fluids as disclosed herein may be reduced or prevented.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

As noted above, the drilling fluids of the present disclosure are direct emulsions of oleaginous and non-oleaginous fluids. Direct emulsion (oil-in-water, o/w), as used herein, is an emulsion in which a non-oleaginous fluid is the continuous phase and an oleaginous fluid is the discontinuous phase.

Oleaginous liquid, as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids.

Non-oleaginous liquid, as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these.

The fluids of the present embodiments may be used in wellbore operations, such as drilling a wellbore into a plurality of differing zones of a subterranean formation. Drilling operations generally may involve pumping a drilling fluid into a wellbore through an earthen formation. In particular, the drilling fluids as described herein may be used to drill sequentially through a water sensitive subterranean formation and a low pressure zone. Conventionally, the characteristics of the fluid to drill through the water sensitive zone would be such that the fluid would not be suitable for drilling through the low pressure zone. For example, the fluids of the present disclosure may have particular applicability when used to drill through types of subterranean formations that include spires or diapirs or "domes" of crystalline rock salt, which are massive "sub-salt" beds typically found in offshore geological formations that may be hundreds to thousands of feet in thickness and depth or similar formation. When drilling through such salt domes, the drilling fluid generally comes in direct contact with the salt. If the drilling fluid is a conventional aqueous based fluid, the rock salt dissolves in the aqueous portion of the fluid, which drastically alters the characteristics of the drilling fluid, specifically by increasing the density of the fluid. The denser fluid, however, would have too high of a density to drill through the low pressure zone. Thus, conventionally, following drilling through the salt dome, such zone would be cased and a new fluid would be introduced into the well. However, the present disclosure uses a direct emulsion as a way to drill through both zones without an intervening casing operation to occur. The incorporation of an internal oleaginous phase serves to "dilute" the fluid to the desired density, without the fluid having the free water content that would allow for a substantial quantity of salt to dissolve therein during drilling through the salt dome, for example.

Thus, the direct emulsion may be formulated to contain salt in an amount that may prevent or inhibit the salt from being leached from the subterranean formation as compared to an otherwise identical fluid (having the same salt content into the non-oleaginous continuous phase) absent the discontinuous oleaginous phase. By preventing substantial quantities of salt being leached from the formation, the density of the fluid does not substantially change, and the fluid may be within the density limits of the low pressure zone under the salt dome (such that losses of fluid to the formation are reduced when drilling through the low pressure zone).

Furthermore, in yet another embodiment, the direct emulsions as described herein may be used for drilling through reactive clay when swelling of the clay in the presence of an aqueous-based drilling fluid may be prevented or reduced. In such an embodiment, the fluid may possess low amounts of free water to interact with the water swellable clays yet be "diluted" by the oleaginous phase to still be within the lower density limits presented by the low pressure zone.

Thus, one or more embodiments of the present disclosure includes a method that involves a method of drilling through a plurality of distinct zones of a subterranean formation, one of which includes a water sensitive zone and one of which includes a low pressure zone. The low pressure zone may simply refer to a zone having a lower pressure than a preceding or upper zone. In one or more embodiments, the method involves drilling through a plurality of differing zones of the subterranean formation using a drilling fluid that includes a non-oleaginous phase, an oleaginous discontinuous phase and at least a first salt dissolved into the non-oleaginous continuous phase. According to various embodiments, drilling through the plurality of differing zones of the subterranean formation occurs without changing the drilling fluid used during the drilling. It is also envisioned that drilling through the plurality of differing zones of the subterranean formation occurs without running a casing into an upper zone of the formation.

In one or more embodiments, the amount of the at least first salt dissolved into the non-oleaginous continuous phase is maintained such that a density of the drilling fluid varies by no more than 10% while drilling through the plurality of zones.

In one or more embodiments, a method of drilling involves drilling into at least an upper zone of a subterranean formation that includes at least one first salt with a drilling fluid including a non-oleaginous continuous phase, an oleaginous discontinuous phase and at least a second salt dissolved into the non-oleaginous continuous phase, and drilling into at least an intermediate zone and/or a lower zone of the subterranean formation using the said drilling fluid. In such embodiments, during the drilling an amount of the at least second salt dissolved into the non-oleaginous continuous phase is maintained such that a density of the drilling fluid varies by no more than 10% during the drilling. In such embodiments, the intermediate zone and/or lower zone of the subterranean formation have a lower pressure than the upper zone. In such embodiments, the non-oleaginous continuous phase is at least substantially saturated with at least the second salt, where the first and the second salt are the same or different. In various embodiments, drilling through the intermediate and/or lower zone occurs without changing the drilling fluid used during the drilling. It is also envisioned that the drilling through the intermediate and/or lower zone occurs without running a casing into the upper zone.

In yet another embodiment, a method of drilling involves drilling into at least an upper zone of a subterranean formation comprising swellable clays therein with a drilling fluid that includes a non-oleaginous continuous phase, an oleaginous discontinuous phase and at least one salt dissolved into the non-oleaginous continuous phase, and drilling into at least an intermediate zone and/or a lower zone of the subterranean formation having a lower pressure than the upper zone using the said drilling fluid. In such embodiments, the amount of the at least one salt is selected to be dissolved into the non-oleaginous continuous phase such that a reactivity of the swellable clay is reduced. As noted below, the salt may be selected from the group of alkali metal halides. In another embodiment, the salt is potassium chloride. In yet another embodiment, the salt may be sodium chloride. In such embodiments, the drilling through the intermediate and/or lower zone occurs without changing the drilling fluid used during the drilling. It is also envisioned that drilling through the intermediate and/or lower zone occurs without running a casing into the upper zone.

As mentioned above, according to the present embodiments, a salt or a mixture of salts may be dissolved into the non-oleaginous continuous phase (such as the aqueous phase) of a direct emulsion. In various embodiments, the salt or mixtures of salts may be added to the non-oleaginous phase during the preparation process of the direct emulsion, prior to drilling. As noted above, a salt or a mixture of salts present in the formation may dissolve into the non-oleaginous portion of the direct emulsion while drilling through a subterranean formation.

Thus, according to the present disclosure, the non-oleaginous phase may contain at least a first salt dissolved therein. During drilling through a water sensitive formation such as a salt dome, which contains at least a second salt, the second salt may dissolve in the non-oleaginous phase which already contains the first salt; however, the amount of the second salt that dissolves into the non-oleaginous phase may be relatively small such that the density of the fluid has no more than 10% variation. In such embodiment, the first salt and the second salt may be the same or different.

For example, the salt in the subterranean formation and the salt present in the aqueous-based drilling fluid may be the same when the salt was leached from the formation and into the aqueous-based drilling fluid. In one non-limiting instance, the salt may be or include, but is not necessarily limited to sodium chloride, magnesium chloride, calcium chloride, potassium chloride, sodium formate, potassium formate, cesium formate, ammonium formate, sodium bromide, potassium bromide, calcium bromide, zinc bromide, ammonium chloride, zinc chloride, calcium nitrate, potassium acetate, magnesium acetate, calcium sulfate dehydrate, and combinations thereof. According to the present embodiments, the salt or the mixture of salts may be dissolved in an amount that keeps the non-oleaginous phase close to saturation. By doing so, there is a low non-oleaginous phase (such as water) content available for interaction with a water sensitive formation.

The salts that have shown utility in the fluids of the present disclosure may be selected from the group of inorganic salts. In various embodiments, the salts may be selected from the group of alkali metal halides. In yet another embodiment, the salt is potassium chloride. In one or more embodiments, the salt may be sodium chloride.

In various embodiments, the drilling fluid may be near-saturation, at saturation or may be supersaturated with salts dissolved into the direct emulsion. For example, the non-oleaginous continuous phase of the direct emulsion may be substantially saturated with a salt or mixtures of salts dissolved into the direct emulsion.

The amount of salt dissolved in a direct emulsion may need to be controlled as the density of the drilling fluids may be increased by dissolving salts therein. The density of the fluid is important because it may balance the density of the fluids in the formation and prevent them from entering the wellbore during drilling. According to the present embodiments, the amount of a salt dissolved into a direct emulsion is maintained such that a density of the drilling fluid varies no more than 10% in an embodiment, or no more than 5% in another embodiment, during drilling through a plurality of zones.

In various embodiments, the amount of at least one salt dissolved in the non-oleaginous continuous phase is selected such that a reactivity of the swellable clay is reduced. It is also envisioned that when drilling through a subterranean formation that contains at least a second salt, using a drilling fluid that includes at least a first salt dissolved into the non-oleaginous phase, the amount of the at least a second salt dissolved into the non-oleaginous phase may be maintained such that a density of the drilling fluid varies by no more than 10% in an embodiment, or no more than 5% in another embodiment.

According to the present embodiments, the amount of salt dissolved in the aqueous phase may be up to 4% wt of saturation. Thus, the density of the aqueous phase may be greater than 9.5 ppg (or greater than 9.8 ppg, or 10 ppg), and an oleaginous phase may be added to the fluid to reduce the density to less than 9.5 ppg. In one or more embodiments, the resulting density of the direct emulsion drilling fluids as described herein may range from about 8.0 ppg to about 11.0 ppg, where the lower limit can be any of 8.0 ppg, 8.5 ppg or 9.0 ppg and the upper limit can be any of 9.5 ppg, 10.0 ppg or 11.0 ppg, where any lower limit can be used with any upper limit. However, it is also envisioned that depending on the type of the brines used, the density of the direct emulsion drilling fluids as described herein may be even higher, for example 16 ppg or even 19 ppg. Maintaining the amount of salt dissolved into the non-oleaginous phase in the above mentioned range, may allow for a suitable density for drilling through the low pressure zone, and by incorporating the emulsified phase into the fluid, the continuous phase may be at a saturation level that prevents or inhibits salt from being leached from a salt-containing subterranean formation, (e.g., a salt dome or the like) or may prevent migration of water when drilling through water sensitive clays.

The non-oleaginous continuous phase used in the formulation of the direct emulsion fluid disclosed herein is a liquid and may be an aqueous liquid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, sulfur, aluminum, magnesium, potassium, strontium, silicon, lithium, and phosphorus salts of chlorides, bromides, carbonates, iodides, chlorates, bromates, formates, nitrates, oxides, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium. According to the present disclosure, the amount of non-oleaginous fluid may be, for example, at least 40 vol %, such as ranging from about 40 vol % to about 95 vol %, where the lower limit can be any of 40 vol %, 45 vol % or 50 vol % and the upper limit can be any of 80 vol %, 85 vol % or 90 vol %, where any lower limit can be used with any upper limit.

The oleaginous discontinuous phase may be a liquid and more specifically is a natural or synthetic oil. In various embodiments, the oleaginous fluid may be selected from the group including diesel oil, mineral oil, a synthetic oil, such as hydrogenated and unhydrogenated olefins including poly(alpha-olefins), linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art, and mixtures thereof. The concentration of the oleaginous fluid should be sufficient so that an direct emulsion forms.

In various embodiments, the wellbore fluids may contain an oleaginous fluid in an amount that ranges from about 5 vol % to about 60 vol %, where the lower limit can be any of 5 vol %, 10 vol %, 20 vol %, 30 vol %, and the upper limit can be any of 40 vol %, 50 vol %, 55 vol %, or 60 vol %, where any lower limit can be used with any upper limit. In specific embodiments, the oleaginous fluid may form 5-60 vol % of the wellbore fluid, with the balance of the fluidic portion being the non-oleaginous fluid.

A direct emulsion may also include conventional additives and/or components such as suspended solids that may include, but are not limited to, weighting agents which may provide additional density beyond that provided by the aqueous phase as needed. Solid weighting agents used in some embodiments disclosed herein may include a variety of inorganic compounds well known to one of skill in the art. Weighting agents or density materials suitable for use in drilling fluids in accordance with the present disclosure include, but are not limited to, hematite, magnetite, iron oxides, illmenite, barite, siderite, celestite, dolomite, calcite, manganese oxides, halites and the like. Weighting agents in accordance with the present disclosure may include commercially available additives such as M-I BAR™ and SAFE CARB™ available from M-I L.L.C. (Houston, Tex.). The quantity of the coated or uncoated weighting agent added, if any, may depend upon the desired density of the final composition.

The drilling fluids as described herein may further include additional chemicals depending upon the end use of the fluid so long as they do not interfere with the functionality of the fluids described herein. Other additives that may be included in the wellbore fluids disclosed herein include for example, emulsifiers, wetting agents, organophilic clays, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulating drilling fluids and muds.

In an embodiment, the drilling fluid as described herein may also include but is not limited to a surfactant in an amount effective to suspend the non-aqueous, non-oleaginous component in the aqueous-based drilling fluid. Such surfactants may be present in the aqueous-based drilling fluid in amounts from about 0.1 wt % to about 8.0 wt %, where the lower limit can be any of 0.1 wt %, 0.5 wt %, 1 wt % or 2 wt % and the upper limit can be any of 5 wt %, 7 wt %, 7.5 wt % or 8 wt %, where any lower limit can be used with any upper limit. The surfactant may be or include, but is not limited to non-ionic surfactants, anionic surfactants, cationic surfactants, amphoteric surfactants, dimeric or gemini surfactants, cleavable surfactants, and combinations thereof.

Other additives for drilling fluids fall into several basic groups including, but not limited to, viscosifiers, such as natural or treated bentonite, mixed metal hydroxide (MMH), mixed metal oxide (MMO), guars or polymers; weighting agents, such as barite or calcium carbonate; surface active agents; emulsifiers; oil wetters; alkalinity control additives; fluid loss reducers; thinners or dispersants; flocculants; defoamers; lubricants; shale inhibitors, such as calcium chloride or amines; corrosion inhibitors and anti accretion agents which reduce or eliminate the potential for raw bitumen oils to build up on the drilling components, rig, or metal surfaces.

Corrosion inhibitors may also be added to the drilling fluids disclosed herein to control the corrosion of the drilling equipment. Depending upon the type of corrosion encountered, the corrosion inhibitor may be organic or inorganic or some combination thereof. Non-limiting examples of corrosion inhibitors include phosphates, silicates, borates, zinc compounds, organic amines, benzoic acid, and benzoic acid derivatives, phosphate esters, heterocyclic nitrogen and sulfur compounds, organic acids, and the like. Non-limiting examples of commercially available corrosion inhibitors include sodium benzoate and benzotriazole.

Conventional methods may be used to prepare the drilling fluids disclosed herein in a manner analogous to those normally used to prepare conventional emulsion fluids. A direct emulsion may be formed by vigorously agitating, mixing, or shearing the oleaginous and non-oleaginous fluids in a selected ratio. In one embodiment, a desired quantity of non-oleaginous phase and oleaginous phase are mixed together and the remaining components are added sequentially with continuous mixing. The addition of the oleaginous phase dilutes the drilling fluid, without diluting the non-oleaginous phase (such as water) by reducing the salt content.

Examples

The following examples are presented to further illustrate the properties of the direct emulsions as described herein.

Initially, a 9.0 ppg direct emulsion fluid was formulated. The formulations prepared are shown below in Table 1. EMI-1933 is a polyacrylate copolymer used to reduce fluid loss in freshwater and seawater muds; EMI-1935 is an emulsifier that reduces the adverse effects of water and drill solids contamination; EMI-1934 is an aqueous blend of surface-active agents which is effective in all water-base systems and EMI-1932 is a saponite clay, all of them available from M-I SWACO, Houston, Tex.

TABLE 1

| Fluid formulation | | 1 | 2 |
|---|---|---|---|
| Water | bbl | 0.622 | 0.615 |
| DUROGEL ™ | lb/bbl | 4 | 8 |
| Soda ash | lb/bbl | 0.5 | 0.5 |
| EMI-1933 | lb/bbl | 3.5 | 3.5 |
| NaCl | lb/bbl | 61.37 | 60.67 |

TABLE 1-continued

| | | | | | |
|---|---|---|---|---|---|
| DUOVIS ® | lb/bbl | 1 | | 1 | |
| Soap | lb/bbl | 0.2 | | | |
| EMI-1935 | lb/bbl | 1 | | 2 | |
| EMI-1934 | lb/bbl | | | 0.2 | |
| EMI-1932 | lb/bbl | | | 8 | |
| Caustic soda | lb/bbl | | | 0.5 | |
| Diesel | bbl | 0.29 | | 0.29 | |

| Mud properties | 1 | 1A | 2 | 2A |
|---|---|---|---|---|
| Heat Aging Temperature, F. | | 150 | | 150 |
| Heat Aging, hr | | 16 | | 16 |
| Static/Rolling | | Rolling | | 150 |
| Mud weight, lb/gal | 9.0 | | 9.1 | |
| Rheology Temp, F. | 120 | 120 | 120 | 120 |
| R600, °VG | 90 | 94 | 165 | 160 |
| R300, °VG | 63 | 65 | 112 | 110 |
| R200, °VG | 51 | 53 | 90 | 89 |
| R100, °VG | 36 | 37 | 63 | 61 |
| R6, °VG | 10 | 11 | 14 | 14 |
| R3, °VG | 8 | 9 | 12 | 12 |
| PV, cP | 27 | 29 | 53 | 50 |
| YP, lb/100 ft$^2$ | 36 | 36 | 59 | 60 |
| LSYP, lb/100 ft$^2$ | 6 | 7 | 10 | 10 |
| 10-sec Gel, lb/100 ft$^2$ | 8 | 9 | 6 | 5 |
| 10-min Gel, lb/100 ft$^2$ | 12 | 12 | 8 | 6 |
| API Filtrate, mL | | 4.8 | | 4.8 |
| pH | | 6.15 | | 9.4 |
| Cl$^-$, mg/L | | 150000 | | 152000 |

Formulation 1 was mixed in the order listed above on a Hamilton Beach mixer and the properties were determined. The sample was then hot rolled and the properties rechecked. After rolling, there was no separation of diesel noted. The filter cake was very thin. A commercial soap was used in the formulation. Formulation 2 includes an increased amount of DUROGEL™ and EMI-1932 to increase the viscosity of the fluid and help control oil separation.

Formulation 3 shown below in Table 2 was mixed on a Hamilton Beach mixer. This formulation reduces the total amount of clay used, as well as omitting the DUROGEL™. This was done to reduce the initial YP of the fluid. The initial properties were determined and the sample was split for contamination testing. While the mud was thicker with the addition of the solids and cement, both remain within a manageable range for normal treatment while drilling.

TABLE 2

| Fluid formulation | | 3 | | | |
|---|---|---|---|---|---|
| Water | bbl | 0.635 | | | |
| EMI-1932 | lb/bbl | 10 | | | |
| Soda ash | lb/bbl | 0.5 | | | |
| EMI-1933 | lb/bbl | 3.5 | | | |
| NaCl | lb/bbl | 62.65 | | | |
| DUOVIS ® | lb/bbl | 1 | | | |
| EMI-1935 | lb/bbl | 2 | | | |
| EMI-1934 | lb/bbl | 0.2 | | | |
| Caustic soda | lb/bbl | 0.5 | | | |
| Diesel | bbl | 0.272 | | | |
| Ocma clay | lb/bbl | | | 35 | |
| Class H cement | lb/bbl | | | | 10 |

| Mud properties | 3 | 3A | 3B | 3C |
|---|---|---|---|---|
| Heat Aging Temperature, F. | | 150 | 150 | 150 |
| Heat Aging, hr | | 16 | 16 | 16 |
| Static/Rolling | | Rolling | 150 | 150 |
| Mud weight, lb/gal | 9.1 | 9.1 | | |
| Rheology Temp, F. | 120 | 120 | 120 | 120 |
| R600, °VG | 126 | 104 | 225 | 155 |
| R300, °VG | 85 | 74 | 155 | 108 |
| R200, °VG | 68 | 61 | 130 | 96 |
| R100, °VG | 46 | 45 | 100 | 62 |
| R6, °VG | 12 | 15 | 35 | 18 |
| R3, °VG | 10 | 13 | 32 | 15 |
| PV, cP | 41 | 30 | 70 | 47 |
| YP, lb/100 ft$^2$ | 44 | 44 | 85 | 61 |
| LSYP, lb/100 ft$^2$ | 8 | 11 | 29 | 12 |
| 10-sec Gel, lb/100 ft$^2$ | 9 | 12 | 28 | 13 |
| 10-min Gel, lb/100 ft$^2$ | 12 | 17 | 59 | 20 |
| API Filtrate, mL | 4.4 | 4.6 | 4 | 4.8 |
| pH | 9.63 | 9.41 | 9.25 | 11.9 |
| Cl$^-$, mg/L | 150000 | | | |

Formulation 4 shown below in Table 3 was mixed on a Hamilton Beach mixer. This formulation reduces the total amount of clay and xanthan used to reduce the viscosity of the fluid. The initial properties were determined and the sample was split for contamination testing. The properties of the fluid are improved after reducing viscosifiers.

TABLE 3

| Fluid formulation | | 4 | | |
|---|---|---|---|---|
| Water | bbl | 0.637 | | |
| EMI-1932 | lb/bbl | 8 | | |
| Soda ash | lb/bbl | 0.5 | | |
| EMI-1933 | lb/bbl | 3.5 | | |
| NaCl | lb/bbl | 62.87 | | |
| DUOVIS ® | lb/bbl | 0.5 | | |
| EMI-1935 | lb/bbl | 2 | | |
| EMI-1934 | lb/bbl | 0.2 | | |
| Caustic soda | lb/bbl | 0.5 | | |
| Diesel | bbl | 0.273 | | |

| Mud properties | 4 | 4A | 4B |
|---|---|---|---|
| Heat Aging Temperature, F. | | 150 | 150 |
| Heat Aging, hr | | 16 | 16 |
| Static/Rolling | | Rolling | Static |
| Mud weight, lb/gal | 9.1 | 9.1 | 9.1 |
| Rheology Temp, F. | 120 | 120 | 120 |
| R600, °VG | 59 | 60 | 55 |
| R300, °VG | 39 | 39 | 36 |
| R200, °VG | 29 | 30 | 29 |
| R100, °VG | 20 | 21 | 20 |
| R6, °VG | 7 | 7 | 7 |
| R3, °VG | 5 | 5 | 5 |
| PV, cP | 20 | 21 | 19 |
| YP, lb/100 ft$^2$ | 19 | 18 | 17 |
| LSYP, lb/100 ft$^2$ | 3 | 3 | 3 |
| 10-sec Gel, lb/100 ft$^2$ | 5 | 6 | 7 |
| 10-min Gel, lb/100 ft$^2$ | 9 | 8 | 9 |
| API Filtrate, mL | 5 | 5.4 | 4.8 |
| pH | 9.35 | 9.2 | 9.2 |
| Cl$^-$, mg/L | 150000 | | |

Formulation 4 was further analysed with hot rolled contamination testing. The results are presented below in Table 4. The contamination series as shown below in Table 4 were prepared and the fluids were hot rolled at 150 F prior to determining the shown properties. For the $CO_2$ testing, 4 grams of $CO_2$ were added to one BEQ of mud using a pressurized aging cell. This represents approximated 16000 mg/L of $CO_2$, simulating a large influx.

TABLE 4

|  |  | 4C | 4D | 4E | 4F | 4G | 4H |
|---|---|---|---|---|---|---|---|
| Fluid formulation |  |  |  |  |  |  |  |
| Water | bbl | 0.637 |  |  |  |  |  |
| EMI-1932 | lb/bbl | 8 |  |  |  |  |  |
| Soda ash | lb/bbl | 0.5 |  |  |  |  |  |
| EMI-1933 | lb/bbl | 3.5 |  |  |  |  |  |
| NaCl | lb/bbl | 62.87 |  |  |  |  |  |
| DUOVIS ® | lb/bbl | 0.5 |  |  |  |  |  |
| EMI-1935 | lb/bbl | 2 |  |  |  |  |  |
| EMI-1934 | lb/bbl | 0.2 |  |  |  |  |  |
| Caustic soda | lb/bbl | 0.5 |  |  |  |  |  |
| Diesel | bbl | 0.273 |  |  |  |  |  |
| Ocma clay | lb/bbl | 20 | 20 | 35 |  |  |  |
| Class H cement | lb/bbl |  | 10 |  | 10 |  |  |
| $CO_2$ | lb/bbl |  |  |  |  | 4 |  |
| NaCl | lb/bbl |  |  |  |  |  | 35 |
| Mud properties |  |  |  |  |  |  |  |
| Heat Aging Temperature, F. |  | 150 | 150 | 150 | 150 | 150 | 150 |
| Heat Aging, hr |  | 16 | 16 | 16 | 16 | 16 | 16 |
| Static/Rolling |  | Rolling | Rolling | Rolling | Rolling | Rolling | Rolling |
| Mud weight, lb/gal |  | 9.23 | 9.27 | 9.54 | 9.18 | 9.1 | 9.31 |
| Rheology Temp, F. |  | 120 | 120 | 120 | 120 | 120 | 120 |
| R600, °VG |  | 112 | 118 | 165 | 70 | 100 | 60 |
| R300, °VG |  | 78 | 75 | 112 | 45 | 68 | 39 |
| R200, °VG |  | 63 | 58 | 90 | 33 | 54 | 30 |
| R100, °VG |  | 44 | 35 | 62 | 21 | 36 | 20 |
| R6, °VG |  | 12 | 6 | 20 | 9 | 9 | 8 |
| R3, °VG |  | 10 | 4 | 18 | 7 | 7 | 6 |
| PV, cP |  | 34 | 43 | 53 | 25 | 32 | 21 |
| YP, lb/100 ft$^2$ |  | 44 | 32 | 59 | 20 | 36 | 18 |
| LSYP, lb/100 ft$^2$ |  | 8 | 2 | 16 | 5 | 5 | 4 |
| 10-sec Gel, lb/100 ft$^2$ |  | 10 | 5 | 16 | 5 | 8 | 7 |
| 10-min Gel, lb/100 ft$^2$ |  | 15 | 11 | 27 | 9 | 11 | 9 |
| API Filtrate, mL |  | 5 | 5.2 | 6 | 5.8 | 5.4 | 4.8 |
| pH |  | 8.95 | 11.93 | 9.05 | 11.85 | 7.3 | 9.04 |

Formulations 4I-4N shown below were set up to determine the effect of long term static aging on the fluids at 150 F. After static aging for 72 hours, the fluids retained good rheological properties and fluid loss control. The sample with 10 ppb cement exhibited some separation which was not seen on the sample with cement and OCMA clay. The sample with 35 ppb additional NaCl had reached saturation.

TABLE 5

|  |  | 4I | 4J | 4K | 4L | 4M | 4N |
|---|---|---|---|---|---|---|---|
| Fluid formulation |  |  |  |  |  |  |  |
| Water | bbl | 0.637 |  |  |  |  |  |
| EMI-1932 | lb/bbl | 8 |  |  |  |  |  |
| Soda ash | lb/bbl | 0.5 |  |  |  |  |  |
| EMI-1933 | lb/bbl | 3.5 |  |  |  |  |  |
| NaCl | lb/bbl | 62.87 |  |  |  |  |  |
| DUOVIS ® | lb/bbl | 0.5 |  |  |  |  |  |
| EMI-1935 | lb/bbl | 2 |  |  |  |  |  |
| EMI-1934 | lb/bbl | 0.2 |  |  |  |  |  |
| Caustic soda | lb/bbl | 0.5 |  |  |  |  |  |
| Diesel | bbl | 0.273 |  |  |  |  |  |
| Ocma clay | lb/bbl | 20 | 20 | 35 |  |  |  |
| Class H cement | lb/bbl |  | 10 |  | 10 |  |  |
| $CO_2$ | lb/bbl |  |  |  |  | 4 |  |
| NaCl | lb/bbl |  |  |  |  |  | 35 |
| Mud properties |  |  |  |  |  |  |  |
| Heat Aging Temperature, F. |  | 150 | 150 | 150 | 150 | 150 | 150 |
| Heat Aging, hr |  | 72 | 72 | 72 | 72 | 72 | 72 |
| Static/Rolling |  | Static | Static | Static | Static | Static | Static |
| Mud weight, lb/gal |  | 9.23 | 9.27 | 9.54 | 9.18 | 9.1 | 9.31 |

TABLE 5-continued

|  | 4I | 4J | 4K | 4L | 4M | 4N |
|---|---|---|---|---|---|---|
| Rheology Temp, F. | 120 | 120 | 120 | 120 | 120 | 120 |
| R600, °VG | 116 | 110 | 168 | 68 | 110 | 64 |
| R300, °VG | 81 | 71 | 117 | 44 | 74 | 40 |
| R200, °VG | 66 | 55 | 93 | 33 | 59 | 31 |
| R100, °VG | 46 | 35 | 64 | 23 | 39 | 21 |
| R6, °VG | 13 | 8 | 20 | 6 | 10 | 8 |
| R3, °VG | 11 | 6 | 18 | 4 | 8 | 6 |
| PV, cP | 35 | 39 | 51 | 24 | 36 | 24 |
| YP, lb/100 ft$^2$ | 46 | 32 | 66 | 20 | 38 | 16 |
| LSYP, lb/100 ft$^2$ | 9 | 4 | 16 | 2 | 6 | 4 |
| 10-sec Gel, lb/100 ft$^2$ | 11 | 7 | 17 | 5 | 8 | 7 |
| 10-min Gel, lb/100 ft$^2$ | 17 | 15 | 29 | 7 | 10 | 8 |
| API Filtrate, mL | 5 | 5.2 | 4.8 | 5 | 4.6 | 4.8 |
| pH | 9.0 | 11.95 | 8.97 | 11.99 | 7.3 | 9.05 |
| Cl$^-$, mg/L | 150000 |  |  |  |  | 180000 |

Formulations 4O-4T as shown below in Table 6, were set up to determine the effect of long term static aging on the fluids at room temperature. After static aging for 72 hours, the fluids retained good rheological properties and fluid loss control. The sample with 10 ppb cement exhibited some separation which was not seen on the sample with cement and OCMA clay. The sample with 35 ppb additional NaCl had reached saturation.

TABLE 6

|  |  | 4O | 4P | 4Q | 4R | 4S | 4T |
|---|---|---|---|---|---|---|---|
| Fluid formulation |  |  |  |  |  |  |  |
| Water | bbl | 0.637 |  |  |  |  |  |
| EMI-1932 | lb/bbl | 8 |  |  |  |  |  |
| Soda ash | lb/bbl | 0.5 |  |  |  |  |  |
| EMI-1933 | lb/bbl | 3.5 |  |  |  |  |  |
| NaCl | lb/bbl | 62.87 |  |  |  |  |  |
| DUOVIS ® | lb/bbl | 0.5 |  |  |  |  |  |
| EMI-1935 | lb/bbl | 2 |  |  |  |  |  |
| EMI-1934 | lb/bbl | 0.2 |  |  |  |  |  |
| Caustic soda | lb/bbl | 0.5 |  |  |  |  |  |
| Diesel | bbl | 0.273 |  |  |  |  |  |
| Ocma clay | lb/bbl | 20 | 20 | 35 |  |  |  |
| Class H cement | lb/bbl |  | 10 |  | 10 |  |  |
| CO$_2$ | lb/bbl |  |  |  |  | 4 |  |
| NaCl | lb/bbl |  |  |  |  |  | 35 |
| Mud properties |  |  |  |  |  |  |  |
| Heat Aging Temperature, F. |  | RT | RT | RT | RT | RT | RT |
| Heat Aging, hr |  | 72 | 72 | 72 | 72 | 72 | 72 |
| Static/Rolling |  | Static | Static | Static | Static | Static | Static |
| Mud weight, lb/gal |  | 9.23 | 9.27 | 9.54 | 9.18 | 9.1 | 9.31 |
| Rheology Temp, F. |  | 120 | 120 | 120 | 120 | 120 | 120 |
| R600, °VG |  | 118 | 100 | 177 | 55 | 107 | 60 |
| R300, °VG |  | 82 | 67 | 119 | 33 | 70 | 40 |
| R200, °VG |  | 65 | 49 | 96 | 26 | 55 | 30 |
| R100, °VG |  | 45 | 30 | 65 | 16 | 37 | 20 |
| R6, °VG |  | 12 | 6 | 21 | 4 | 9 | 6 |
| R3, °VG |  | 10 | 4 | 19 | 2 | 7 | 5 |
| PV, cP |  | 36 | 33 | 58 | 22 | 37 | 20 |
| YP, lb/100 ft$^2$ |  | 46 | 34 | 61 | 11 | 33 | 20 |
| LSYP, lb/100 ft$^2$ |  | 8 | 2 | 17 | 0 | 5 | 4 |
| 10-sec Gel, lb/100 ft$^2$ |  | 11 | 6 | 19 | 3 | 8 | 5 |
| 10-min Gel, lb/100 ft$^2$ |  | 17 | 11 | 32 | 5 | 10 | 7 |
| API Filtrate, mL |  | 4.2 | 5 | 4.4 | 4.8 | 4.8 | 4.8 |
| pH |  | 9.0 | 11.94 | 8.95 | 11.94 | 7.2 | 9.0 |
| Cl$^-$, mg/L |  | 150000 |  |  |  |  | 180000 |

In the case of formulation 4, the base fluid after aging was very stable. A visual comparison (not shown) between formulation 4 after hot rolling and after static aging shows the following: a brown muddy liquid with a lower density red thin layer for formulation 4 after hot rolling, and a brown muddy liquid with no lower density red layer for after static aging.

The results of the visual comparison for 72 hours static aged contamination fluids (not shown) are presented below in Table 7. No picture was possible of the $CO_2$ contamination because the tests were done in an aging cell.

TABLE 7

| Formulation | Appearance |
| --- | --- |
| 20 ppb OCMA | Light brownish tan mud |
| 35 OCMA | Light tan mud |
| 10 ppb cement | Dark tan mud with liquid separation at the bottom |
| 20 ppb OCMA + 10 ppb cement | Dark tan mud with no separation at the bottom |
| 35 ppb NaCl | Light brownish tan mud |

As shown above, formulation 4 provides better results than the other formulations. Formulation 3 was prepared and contaminations performed. Formulation 4 was prepared to reduce the viscosity of the fluid, both initially and after contaminations. This formulation produced a workable fluid with little separation noted.

A new series of formulations 5 includes 10% diesel. In formulation 5A, the sample is contaminated with 35 ppb simulated drill solids. Formulation 6 brings the oil concentration to 30%. Formulation 6A adds an additional 50 ppb simulated drill solids to the fluid. The formulations are presented below in Table 8. The base mud (10% fluid) after hot rolling at 150 F for 16 hours (not shown) is a very light brown muddy liquid with a lower density red thin layer.

TABLE 8

| | | 5 | 5A | 6 | 6A |
| --- | --- | --- | --- | --- | --- |
| Fluid formulation | | | | | |
| Water | bbl | 0.79 | | | |
| Soda ash | lb/bbl | 0.5 | | | |
| EMI-1932 | lb/bbl | 12 | | | |
| EMI-1933 | lb/bbl | 3.5 | | | |
| NaCl | lb/bbl | 77.99 | | | |
| Caustic soda | lb/bbl | 0.5 | | | |
| DUOVIS ® | lb/bbl | 0.5 | | | |
| EMI-1934 | lb/bbl | 3 | | | |
| EMI-1935 | lb/bbl | 2 | | | |
| Diesel | bbl | 0.1 | | 0.2 | |
| Ocma Clay | lb/bbl | | 2.5 | 2.5 | 5 |
| SAFECARB 40 ® | lb/bbl | | 32.5 | 32.5 | 45 |
| Mud properties | | | | | |
| Mud weight, lb/gal | | 9.51 | 10.02 | 9.45 | 9.97 |
| Rheology Temp, F. | | 120 | 120 | 120 | 120 |
| R600, °VG | | 47 | 57 | 67 | 102 |
| R300, °VG | | 30 | 37 | 43 | 68 |
| R200, °VG | | 24 | 29 | 34 | 52 |
| R100, °VG | | 16 | 19 | 23 | 35 |
| R6, °VG | | 4 | 5 | 6 | 10 |
| R3, °VG | | 3 | 4 | 5 | 9 |
| PV, cP | | 17 | 20 | 24 | 34 |
| YP, lb/100 ft$^2$ | | 13 | 17 | 19 | 34 |
| LSYP, lb/100 ft$^2$ | | 2 | 3 | 4 | 8 |
| 10-sec Gel, lb/100 ft$^2$ | | 3 | 4 | 5 | 9 |
| 10-min Gel, lb/100 ft$^2$ | | 5 | 6 | 6 | 15 |
| API Filtrate, mL | | 5.2 | 4.8 | 4.4 | 5 |
| Solids, vol. % | | | | | 14 |
| Non-aqueous, vol. % | | | | | 22 |
| Water, %/vol. | | | | | 64 |
| O/W Ratio | | | | | 26/74 |

Advantageously, embodiments of the present disclosure may provide drilling fluids and methods of using such fluids that include a non-oleaginous continuous phase, an oleaginous discontinuous phase and at least a salt dissolved into the non-oleaginous continuous phase. The amount of salt dissolved in the non-oleaginous phase is maintained such that a density of the drilling fluid varies no more than 10% while drilling through a water sensitive formation that has a plurality of zones. By doing so, the loss of water into the formation or the amount of salt leached from the formation is reduced or minimized. The drilling fluids of the present disclosure exhibit high stability and may be used in drilling through salt domes or reactive clay formations. Drilling using the drilling fluids of the present disclosure may allow for drilling without changing the drilling fluid used during the drilling, as well as without running a casing into an upper zone. Therefore, the drilling fluids as disclosed herein may provide for more efficient drilling methods with lower costs.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method comprising:
   drilling through a plurality of differing zones of a subterranean formation using a drilling fluid comprising:
   a non-oleaginous continuous phase in an amount from 40 vol % to 95 vol %;
   an oleaginous discontinuous phase in an amount from 5 vol % to 60 vol %;
   a saponite clay; a surfactant in an amount from 0.1 wt % to 8.0 wt %; and
   at least one first salt dissolved into the non-oleaginous continuous phase,
   wherein
   an amount of the at least one first salt dissolved into the non-oleaginous continuous phase is maintained such that a density of the drilling fluid varies by no more than 10% while drilling through the plurality of differing zones,
   the at least one first salt is selected from a group consisting of sodium chloride, calcium chloride, potassium chloride, sodium formate, potassium formate, cesium formate, sodium bromide, potassium bromide, calcium bromide, zinc bromide, zinc chloride, calcium nitrate, potassium acetate, calcium sulfate dehydrate, and combinations thereof, and
   a density of the drilling fluid ranges from about 8.0 ppg to about 11.0 ppg.

2. The method of claim 1, wherein the non-oleaginous continuous phase is an aqueous phase selected from the group consisting of fresh water, sea water, brine, and mixtures thereof.

3. The method of claim 2, wherein the non-oleaginous continuous phase is substantially saturated with the at least one first salt.

4. The method of claim 1, wherein the oleaginous discontinuous phase is selected from the group consisting of natural and synthetic oils.

5. The method of claim 1, wherein at least one zone of the subterranean formation comprises at least one second salt, wherein the at least one first salt and the at least one second salt are the same salt.

6. The method of claim 1, wherein the subterranean formation comprises swellable clay.

7. The method of claim 1, wherein drilling through the plurality of differing zones of the subterranean formation occurs without changing the drilling fluid used during the drilling.

8. The method of claim 1, wherein drilling through the plurality of differing zones of the subterranean formation occurs without running a casing into an upper zone.

9. The method of claim 1, wherein the at least one salt is sodium chloride and present in the drilling fluid at a concentration of 60.67 lb/bbl to 62.87 lb/bbl.

10. A method comprising:
drilling into at least an upper zone of a subterranean formation having at least one first salt therein with a drilling fluid comprising:
a non-oleaginous continuous phase in an amount from 40 vol % to 95 vol %;
an oleaginous discontinuous phase in an amount from 5 vol % to 60 vol %;
a saponite clay; a surfactant in an amount from 0.1 wt % to 8.0 wt %; and
at least one second salt dissolved into the non-oleaginous continuous phase,
wherein, during the drilling, an amount of the at least one second salt dissolved into the non-oleaginous continuous phase is maintained such that a density of the drilling fluid varies by no more than 10% during the drilling, the non-oleaginous continuous phase is an aqueous phase, an amount of the at least one second salt dissolved in the aqueous phase is up to 4 wt % of saturation, the at least one second salt is selected from the group consisting of sodium chloride, calcium chloride, potassium chloride, sodium formate, potassium formate, cesium formate, sodium bromide, potassium bromide, calcium bromide, zinc bromide, zinc chloride, calcium nitrate, potassium acetate, calcium sulfate dehydrate, and combinations thereof, and a density of the drilling fluid ranges from about 8.0 ppg to about 11.0 ppg; and
drilling into at least one selected from an intermediate zone and a lower zone of the subterranean formation using the drilling fluid.

11. The method of claim 10, wherein the aqueous phase is selected from the group consisting of fresh water, sea water, brine, and mixtures thereof.

12. The method of claim 10, wherein the at least one first salt and the at least one second salt are the same salt.

13. The method of claim 10, wherein the at least one selected from the intermediate zone and the lower zone of the subterranean formation has a lower pressure than the upper zone.

14. The method of claim 10, wherein drilling through the at least one selected from the intermediate zone and the lower zone occurs without changing the drilling fluid used during the drilling.

15. The method of claim 10, wherein drilling through the at least one selected from the intermediate zone and the lower zone occurs without running a casing into the upper zone.

16. A method comprising:
drilling into at least an upper zone of a subterranean formation having swellable clays therein with a drilling fluid comprising:
a non-oleaginous continuous phase in an amount from 40 vol % to 95 vol %;
an oleaginous discontinuous phase in an amount from 5 vol % to 60 vol %;
a saponite clay; a surfactant in an amount from 0.1 wt % to 8.0 wt %;
and
at least one salt dissolved into the non-oleaginous continuous phase,
wherein
an amount of the at least one salt is selected to be dissolved into the non-oleaginous continuous phase such that a reactivity of the swellable clay is reduced and the at least one salt is selected from the group consisting of sodium chloride, calcium chloride, potassium chloride, sodium formate, potassium formate, cesium formate, sodium bromide, potassium bromide, calcium bromide, zinc bromide, zinc chloride, calcium nitrate, potassium acetate, calcium sulfate dehydrate, and combinations thereof; and
drilling into at least one selected from an intermediate zone and a lower zone of the subterranean formation having a lower pressure than the upper zone using the drilling fluid.

17. The method of claim 16, wherein the at least one salt is sodium chloride or potassium chloride.

18. The method of claim 16, wherein drilling through the at least one selected from the intermediate zone and the lower zone occurs without changing the drilling fluid used during the drilling.

19. The method of claim 16, wherein drilling through the at least one selected from the intermediate zone and the lower zone occurs without running a casing into the upper zone.

* * * * *